United States Patent [19]
Polk et al.

[11] Patent Number: 5,648,706
[45] Date of Patent: Jul. 15, 1997

[54] ELECTRIC BRAKE FOR COMMUTATED MOTOR

[75] Inventors: Gary C. Polk, Hawthorn Woods; Peter Domeny, Northbrook, both of Ill.

[73] Assignee: S-B Power Tool Company, Chicago, Ill.

[21] Appl. No.: 535,866

[22] Filed: Sep. 28, 1995

[51] Int. Cl.⁶ .................................................. H02P 3/14
[52] U.S. Cl. .............. 318/376; 318/375; 318/381; 318/759; 310/212
[58] Field of Search ........................... 318/376, 375, 318/381, 759; 310/242, 248, 247, 239, 241

[56] References Cited

U.S. PATENT DOCUMENTS

| | | |
|---|---|---|
| 4,329,611 | 5/1982 | Ohmstedt et al. ............... 310/241 X |
| 4,388,573 | 6/1983 | Horiuchi et al. ............... 318/376 |
| 4,488,078 | 12/1984 | Orton ............................ 310/242 |
| 4,725,765 | 2/1988 | Prestel .......................... 318/305 |
| 5,006,747 | 4/1991 | Stewart, Sr. ................. 310/242 X |
| 5,063,319 | 11/1991 | Mason ......................... 310/210 |
| 5,294,874 | 3/1994 | Hessenberger et al. ........ 318/759 |

OTHER PUBLICATIONS

Schunk & EBE GMBH publication of Jan. 1982.
Schunk Kohlenstofftechnik GmbH publication of Jan. 1995.
Ohio Carbon brochure—undated.

*Primary Examiner*—Karen Masih
*Attorney, Agent, or Firm*—Jones, Day, Reavis & Pogue

[57] ABSTRACT

A series motor for an appliance or tool, such as a circular saw, includes a regenerative braking circuit having brake windings in addition to the run windings. One of the brushholder assemblies includes a push-away feature for separating one of the brushes from the commutator prior to the time the brush could wear to an extent that direct current reversal might not be available to achieve the desired braking action.

4 Claims, 2 Drawing Sheets

ELECTRIC BRAKE FOR COMMUTATED MOTOR

BACKGROUND OF THE INVENTION

The present invention relates to series wound motors, also referred to as universal motors. In particular, the invention relates to an electric braking system for such motors.

In certain appliances and tools which utilize series motors, it is desireable to stop the movable working member in a very short period of time rather than letting the working member "coast" to a stop upon deenergization of the motor. For example, in some tools, such as circular saws, unbraked stopping time may be rather long, such as 7 to 12 seconds, due to inertia of the motor armature, the gearing, the shaft and the circular saw blade. It is often advantageous to stop the circular saw blade or other rotating working member in a much shorter time period, say 2 to 3 seconds.

Mechanical brake systems have been provided for tools and appliances of the type under consideration. These mechanical brakes suffer from a number of disadvantages. Mechanical brakes are bulky thus adding undesired weight to the tool or appliance. Further, these mechanical brakes are expensive to manufacture and require frequent maintenance.

The prior art also includes electric brake systems for stopping the rotating working member of a tool or appliance. The most common form of electric brake system employs a regenerative principle. When a regenerative circuit is used, release of the "on-off" switch of the tool or appliance creates a reversal of polarity effective between the field windings and the armature windings. In the presence of the residual magnetic field in the stator, regenerative direct current reversal is produced through the armature and field windings. This current flow is in the direction of reversing armature rotation and its effect is to slow and stop the armature. Thus, rotation is stopped more quickly than if the tool is allowed to "coast" to a stop relying only on friction and windage. Since regenerative brake circuits rely on current flow between the brushes and the commutator, it is necessary to provide for very good contact between the brushes and the commutator to ensure reliability and effectiveness of the braking circuit.

The carbon brushes used in series motors are normally supported in a brushholder which is in the form of a parallelopiped open at one end thereof. A coil spring in the brushholder urges or biases the brush into engagement with the rotating commutator. It is known in the art to provide such brushholders with mechanical means for limiting the amount of travel of the brush and to cause the brush to be pushed away from the commutator when the brush has been worn a predetermined amount. The purpose of this particular type of brushholder is to prevent the brush from wearing to an extent that the remaining portion of the brush might become dislodged from the brushholder. In that event, it is likely that the coil spring will contact the rotating armature thus causing not only shorting but damage to the commutator as well. Brushholders with means for limiting the amount of brush movement also avoid a condition where the coil spring would stop in the brushholder and not urge or bias the brush into engagement with the rotating commutator. This situation would cause extra arcing and generate damage to the commutator. Although these forms of brushholders have been available for many, many years, they have not been employed in braking circuits for separating at least one brush from the commutator prior to the time the brush might wear to an extent that reverse current could not be properly conducted to achieve the regenerative braking effect.

SUMMARY OF THE INVENTION

It is a primary object of the present invention to provide a series or universal motor with a regenerative braking system having a high degree of reliability and effectiveness.

It is a further object of the present invention to provide a series motor with a regenerative braking system which will permanently deenergize the motor prior to the time brush wear might make the braking system unreliable.

Another object of the present invention is the provision of a series motor with a regenerative braking system which includes means to separate at least one of the brushes from the commutator prior to the time such brush might wear to an extent that the braking system would not operate in a dependable and reliable manner.

These and other objects and advantages of the invention will become apparent from the following specification describing a preferred embodiment.

DESCRIPTION OF A PREFERRED EMBODIMENT

Figure 1:
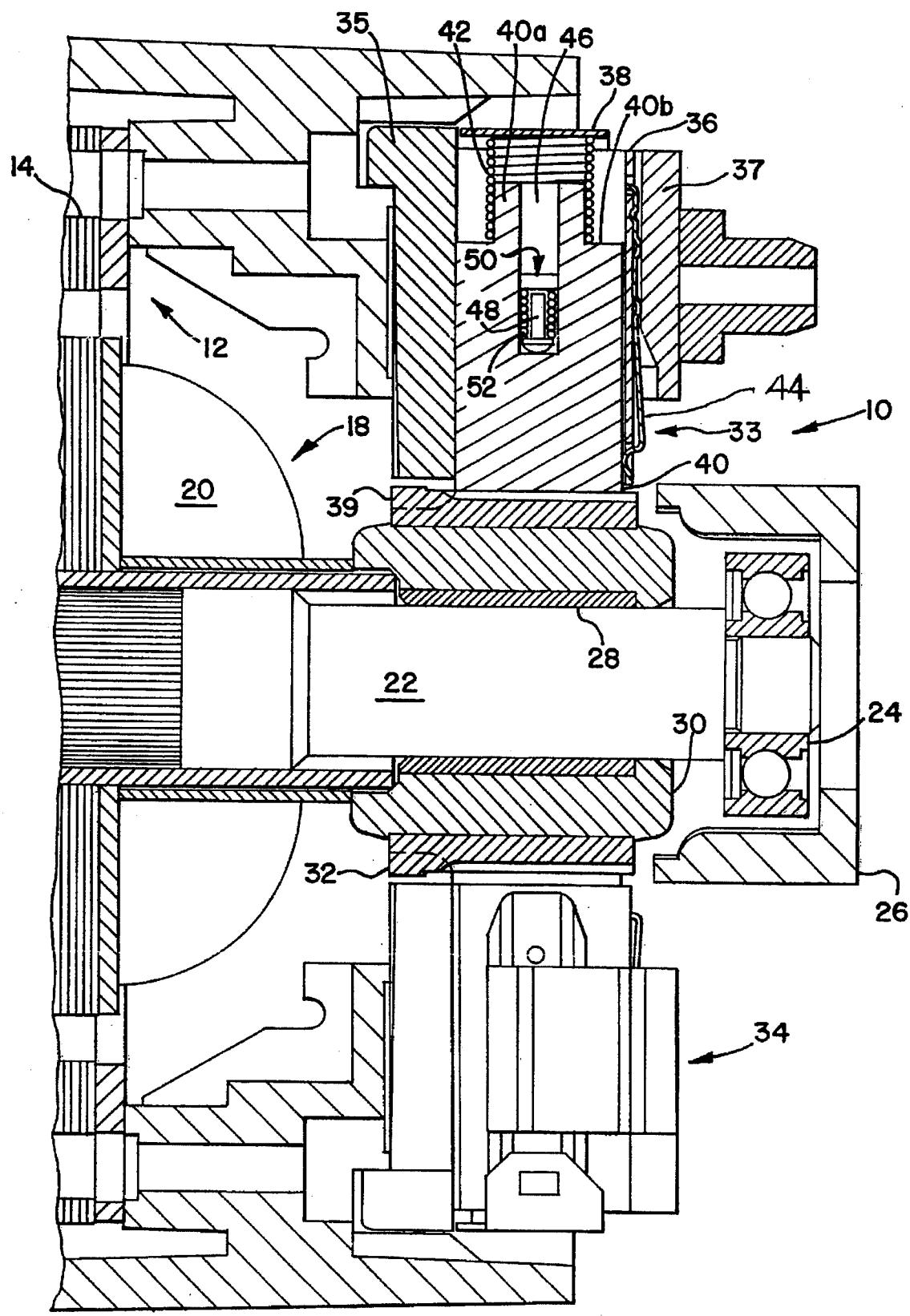
FIG. 1 is a partial section and partial elevation of a series motor embodying the present invention.

Referring primarily to FIG. 1, a series wound motor incorporating the present invention is generally designated 10. The motor includes a stator, generally designated 12, formed by adjacent plates 14 supporting field windings 16a, 16b (shown schematically in FIG. 2). The motor includes an armature, generally designated 18, having windings 20. The armature includes a shaft 22 for rotatably mounting the armature in the stator. In this regard, one end of the shaft 22 is mounted in an annular bearing assembly 24 which is in turn supported in an annular cap 26 mounted in the housing of a tool, such as a circular saw, by way of example. It will be understood that the other end of the shaft 22 is similarly mounted.

The shaft 22 mounts first and second annular commutator members 28 and 30. The member 30 mounts the usual commutator bars 32 which are in electrical contact with the armature windings.

The motor 10 includes a pair of oppositely and diametrically disposed brush holder assemblies, generally designated 33 and 34. The brushholder assembly 33 includes a brushholder consisting of dielectric members 35, 37 and conducting members 36, 38. These four members define a parallelopiped unit open at its end adjacent the commutator. The members 35, 36,and 38 cooperate to mount a carbon brush 40 which is of rectangular cross-section in the embodiment shown for purposes of illustration. The brush 40 includes a portion 40a of reduced cross-section thereby defining a shoulder 40b. The portion 40a is received within one end of a coil spring 42. One end of this spring abuts the shoulder 40b; the other end of the spring 42 abuts the brushholder member 38. It will be understood that the spring 42 serves to urge the inner end of the brush 40 into sliding or wiping engagement with the rotating commutator bars 32. A leaf spring 44 may be provided to stabilize the brush 40 as it slides in the brushholder upon wear on the end of the brush engaging the commutator.

The brush 40 includes a blind bore 46 which receives a plug 48 made of a dielectric pliant material, such as wood.

A stop member 50 is fixed in the bore 46 by any suitable means. A coil spring 52 encircles a reduced-in-diameter portion of the plug 48. One end of the spring engages a shoulder on the plug; the other end of the spring 52 engages the stop 50.

The brush 40 will eventually wear to an extent that the rounded end of the plug 48 will become exposed and thus engage the commutator bars. The spring 52 will then operate to push the brush 40 away from the commutator bars. This movement results because the axial force produced by the spring 52 is greater than the axial force produced by the spring 42. When the brush 40 is separated from the commutator, the motor will of course become deenergized. Thus, the push-a-way feature will cause deenergization of the motor when the brush has worn a predetermined extent determined by the distance between the base of the bore 46 and the end of the brush (when new) which engages the commutator.

The brushholder 34 is preferably identical in construction with the brushholder 33. However, the brushholder 34 need not include the plug 48, stop 50 and spring 52 for pushing the other brush away from the commutator. The objectives of the present invention can be achieved by utilizing only one of the brushholders with the push-a-way feature for current interrupt.

Figure 2:
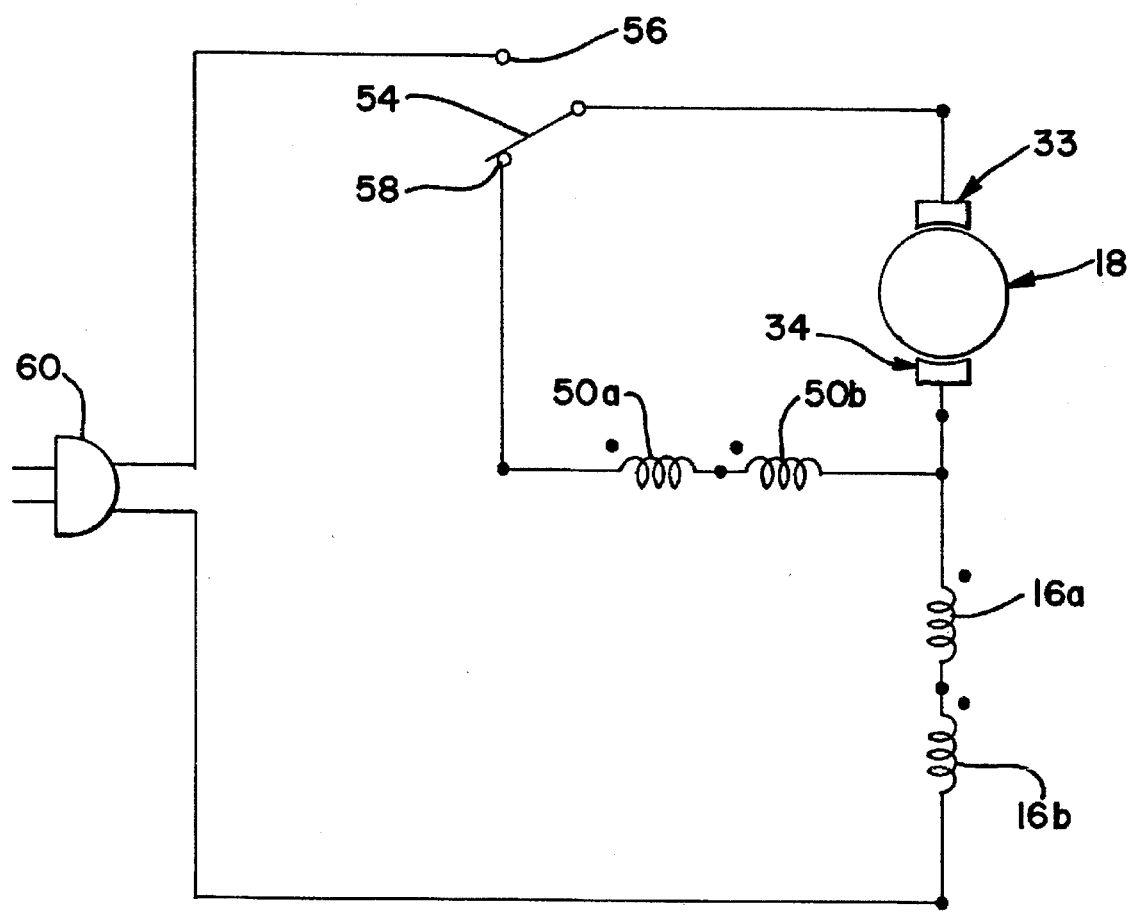
FIG. 2 is schematic diagram of the regenerative brake circuit of the present invention.

Referring now to FIG. 2, it is seen that the stator run windings 16a,16b are connected in series with the armature 18. It will be understood that the stator field windings are wound to include a pair of brake windings 50a,50b in addition to the run windings 16a,16b. A switch element 54, controlled by the tool trigger, is movable between an "On" terminal 56 and an "Off/Brake" terminal 58. When the switch element 54 is in contact with the terminal 56, the run windings 16a,16b are connected in series with the armature 18 and the motor is energized in the normal manner from the source of electrical power 60. When the trigger is released, the switch separates from the terminal 56 thus disconnecting the armature and run windings from the source of power. Simultaneously, the switch element will contact the terminal 58 thus connecting the brake windings 50a,50b in shunt across the armature 18. Switching the motor from the run condition to the off or brake condition creates a reversal of polarity between the field windings and the armature windings. In the presence of the residual magnetic field in the stator, regenerative direct current reversal is produced through the armature and field windings. This current flow is in the direction of reversing armature rotation and its effect is to slow and stop the armature more quickly than if the tool was allowed to coast to a stop relying only on windage and friction.

Accordingly, it is seen that the present invention provides a new and improved braking system which is highly reliable because at least one of the brushes will be separated from the commutator (thus deactivating the motor) prior to a time the brush could wear to an extent that proper direct current reversal might not be available to achieve the desired braking action. Other embodiments, within the scope of the invention and intended to be covered by the following claims, will suggest themselves to those of ordinary skill in the art.

We claim:

1. A device powered by a universal electric motor for moving a working element comprising:

(a) a stator including field windings;

(b) an armature having windings and being rotatably mounted within said stator and a commutator mounted for rotation with said armature;

(c) at least a pair of brushholders containing respective brushes in physical contact with said commutator;

(d) at least one of said brushholders containing means to push its associated brush away from the commutator when said brush has worn to a predetermined extent;

(e) means constituting a regenerative brake circuit connected to said field and armature windings which, when activated, will establish a regenerative direct current flow across said commutator and brushes; and (f) switch means alternately operable between a first position wherein said motor is energized and said brake circuit is deactivated and a second position wherein said motor is deenergized and said brake circuit is activated.

2. The device according to claim 1 further defined by:

(a) said associated brush having one end thereof mounted for wiping engagement with said commutator, said brush having an opposite end and a bore extending longitudinally of the brush and having one end thereof opening at said opposite end of the brush and the other end thereof disposed intermediate the ends of the brush;

(b) a dielectric pliant element disposed in said bore;

(c) first spring means in said bore in engagement with said element for biasing the element against said other end of the bore; and (d) second spring means mounted in said one brushholder and engaged with said opposite end of the brush for biasing the brush into engagement with the commutator, said second spring means generating a spring force less than the spring force of said first spring means such that said first spring means will force said brush away from said commutator when said element engages the commutator after said one end of said brush wears to an extent exposing said element and thus allowing the element to engage the commutator.

3. The device according to claim 2 wherein said element is formed of wood.

4. The device according to claim 1 wherein said field windings include separate run and brake windings.

* * * * *